(12) United States Patent
Young et al.

(10) Patent No.: US 11,378,025 B2
(45) Date of Patent: Jul. 5, 2022

(54) GASEOUS FUEL CONSUMING ENGINE CONTROLLING SYSTEMS

(71) Applicant: COLORADO STATE UNIVERSITY RESEARCH FOUNDATION, Fort Collins, CO (US)

(72) Inventors: Peter M. Young, Fort Collins, CO (US); Yi Han, Fort Collins, CO (US); Daniel Zimmerle, Fort Collins, CO (US)

(73) Assignee: COLORADO STATE UNIVERSITY RESEARCH FOUNDATION, Fort Collins, CO (US)

( * ) Notice: Subject to any disclaimer, the term of this patent is extended or adjusted under 35 U.S.C. 154(b) by 0 days.

(21) Appl. No.: 16/858,346

(22) Filed: Apr. 24, 2020

(65) Prior Publication Data

US 2020/0263615 A1    Aug. 20, 2020

Related U.S. Application Data

(62) Division of application No. 15/519,507, filed as application No. PCT/US2015/057606 on Oct. 27, 2015, now Pat. No. 10,683,815.

(Continued)

(51) Int. Cl.
*F02D 31/00* (2006.01)
*F02D 19/02* (2006.01)
(Continued)

(52) U.S. Cl.
CPC .......... *F02D 31/007* (2013.01); *F02D 19/02* (2013.01); *F02D 29/06* (2013.01); *F02D 31/002* (2013.01);
(Continued)

(58) Field of Classification Search
CPC ........ F02D 19/02; F02D 29/06; F02D 31/002; F02D 31/007; F02D 41/0002;
(Continued)

(56) References Cited

U.S. PATENT DOCUMENTS 5,243,954 A    9/1993  Moss
6,876,097 B2*  4/2005  Thomas .............. F02D 41/0007
                                                290/40 A (Continued)

OTHER PUBLICATIONS

International Search Report dated Mar. 17, 2016 in related PCT Application No. PCT/US2015/057606 (4 pages).

(Continued)

*Primary Examiner* — Hung Q Nguyen
*Assistant Examiner* — Mark L. Greene
(74) *Attorney, Agent, or Firm* — Maschoff Brennan; Paul G. Johnson

(57) ABSTRACT

According to some embodiments, the present disclosure may relate to a system including a gaseous fuel consuming engine operating at an air to fuel ratio (AFR) and including a throttle valve controlling a speed of engine, and an engine controller coupled to the engine. The engine controller may be configured to obtain the speed of the engine and obtain the AFR of the engine. The engine controller may also be configured to, based on a transient event affecting the engine, coordinate modification of both the throttle valve to change the speed of the engine and trim valve to change the AFR of the engine to maintain at least one of the speed and the AFR of the engine within a threshold deviance.

14 Claims, 7 Drawing Sheets

Related U.S. Application Data

(60) Provisional application No. 62/069,658, filed on Oct. 28, 2014.

(51) Int. Cl.
*F02D 29/06* (2006.01)
*F02D 41/00* (2006.01)

(52) U.S. Cl.
CPC ..... *F02D 41/0002* (2013.01); *F02D 41/0027* (2013.01); *F02D 2200/101* (2013.01); *F02D 2200/503* (2013.01); *Y02T 10/30* (2013.01); *Y02T 10/40* (2013.01)

(58) Field of Classification Search
CPC ........... F02D 41/0027; F02D 2200/101; F02D 2200/503; Y02T 10/30; Y02T 10/40
See application file for complete search history.

(56) References Cited

U.S. PATENT DOCUMENTS

| | | |
|---|---|---|
| 7,291,935 B2 | 11/2007 | Yamashita |
| 7,455,058 B2 | 11/2008 | Raffesberger |
| 2006/0064227 A1 | 3/2006 | Uhde |
| 2008/0116695 A1 | 5/2008 | Peterson |
| 2009/0076708 A1 | 3/2009 | Shiraishi et al. |
| 2010/0001585 A1 | 1/2010 | Nagata |
| 2010/0270864 A1 | 10/2010 | Vyas et al. |
| 2011/0215640 A1 | 9/2011 | Donnelly et al. |
| 2014/0159365 A1* | 6/2014 | Algrain .................... H02J 3/32 290/7 |

OTHER PUBLICATIONS

Written Opinion dated Mar. 17, 2016 in related PCT Application No. PCT/US2015/057606 (8 pages).
Lady Ada, "Voltages," Jul. 29, 2012 (Year 2012).

* cited by examiner

1

GASEOUS FUEL CONSUMING ENGINE CONTROLLING SYSTEMS

CROSS-REFERENCE TO A RELATED APPLICATION

This application is a divisional of U.S. patent application Ser. No. 15/519,507, filed Apr. 14, 2017, and titled "GASEOUS FUEL CONSUMING ENGINE CONTROLLING SYSTEMS" which is the US national stage of International Application No. PCT/US2015/057606, filed Oct. 27, 2015, and titled "GASEOUS FUEL CONSUMING ENGINE CONTROLLING SYSTEMS," which claims priority to U.S. Provisional Patent Application No. 62/069,658, filed Oct. 28, 2014, and titled "ADVANCED MULTIVARIABLE ROBUST CONTROL FOR INTEGRATED ENGINE/STORAGE MICROGRID SYSTEMS". All of the foregoing applications are incorporated herein by reference in their entireties.

FIELD

One or more embodiments discussed in the present disclosure are related to gaseous fuel consuming engine controlling systems.

BACKGROUND

There are many situations in which a gaseous fuel consuming engine may be a beneficial tool for providing electrical or mechanical power. However, current control systems for gaseous fuel consuming engines have limitations.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a system that includes a gaseous fuel consuming engine that includes a throttle valve controlling a speed of the gaseous fuel consuming engine and a trim valve controlling an air to fuel ratio of the gaseous fuel consuming engine. The system may also include an engine controller coupled to the gaseous fuel consuming engine that may be configured to obtain the speed of the gaseous fuel consuming engine and obtain the air to fuel ratio of the gaseous fuel consuming engine. The controller may also be configured to coordinate modification of both the throttle valve to change the speed of the gaseous fuel consuming engine and the trim valve to change the air to fuel ratio of the gaseous fuel consuming engine to maintain at least one of the speed and the air to fuel ratio of the gaseous fuel consuming engine within a threshold deviance. The modification may be based on a transient event affecting the gaseous fuel consuming engine.

One or more additional embodiments of the present disclosure may include a method. The method may include generating a model of a power generating system. The power generating system being modeled may include a gaseous fuel consuming engine with a throttle valve that controls a speed of the gaseous fuel consuming engine and a trim valve that controls an air to fuel ratio of the gaseous fuel consuming engine. The model may include multiple disturbances that modify operation of the gaseous fuel consuming engine as inputs to the model and a controller configured to modify both the throttle valve and the trim valve of the gaseous fuel consuming engine in a coordinated manner. The model may additionally include multiple operation parameters of the gaseous fuel consuming engine that are individually weighted as outputs of the model. The method may also include optimizing the model to identify a relationship between the trim valve and the throttle valve by which the controller may modify both the throttle valve and the trim valve to minimize variation in the outputs of the model. The model may additionally include providing a physical controller configured to operate a physical gaseous fuel consuming engine according to the relationship between the trim valve and the throttle valve.

One or more additional embodiments of the present disclosure may include an engine controller for controlling a gaseous fuel consuming engine. The engine controller may include non-transitory instructions configured to cause the engine controller to obtain a speed of the gaseous fuel consuming engine and obtain an air to fuel ratio of the gaseous fuel consuming engine. The instructions may additionally cause the engine controller to coordinate modification of both a throttle valve to change the speed of the gaseous fuel consuming engine and a trim valve to change the air to fuel ratio of the gaseous fuel consuming engine to maintain at least one of the speed and the air to fuel ratio of the gaseous fuel consuming engine within a threshold deviance. The modification may be based on a transient event affecting the gaseous fuel consuming engine.

One or more additional embodiments of the present disclosure may include a storage controller coupled to an energy storage device and a gaseous fuel consuming engine. The storage controller may include non-transitory instructions configured to cause the storage controller to obtain a speed of the gaseous fuel consuming engine and obtain a state of charge of the energy storage device. The instructions may additionally cause the storage controller to cause the energy storage device to discharge in an amount sufficient to approximately maintain the speed of the gaseous fuel consuming engine. The discharge of the energy storage device may be in response to a transient event affecting the gaseous fuel consuming engine and may be based on a relationship between the speed of the gaseous fuel consuming engine and the state of charge of the energy storage device. The object and advantages of the embodiments will be realized and achieved at least by the elements, features, and combinations particularly pointed out in the claims.

Both the foregoing general description and the following detailed description provide examples and are explanatory and are not restrictive.

BRIEF DESCRIPTION OF THE DRAWINGS

Example embodiments will be described and explained with additional specificity and detail through the use of the accompanying drawings, all illustrated in accordance with one or more embodiments of the present disclosure, and in which.

DESCRIPTION OF EMBODIMENTS

Figure 1:
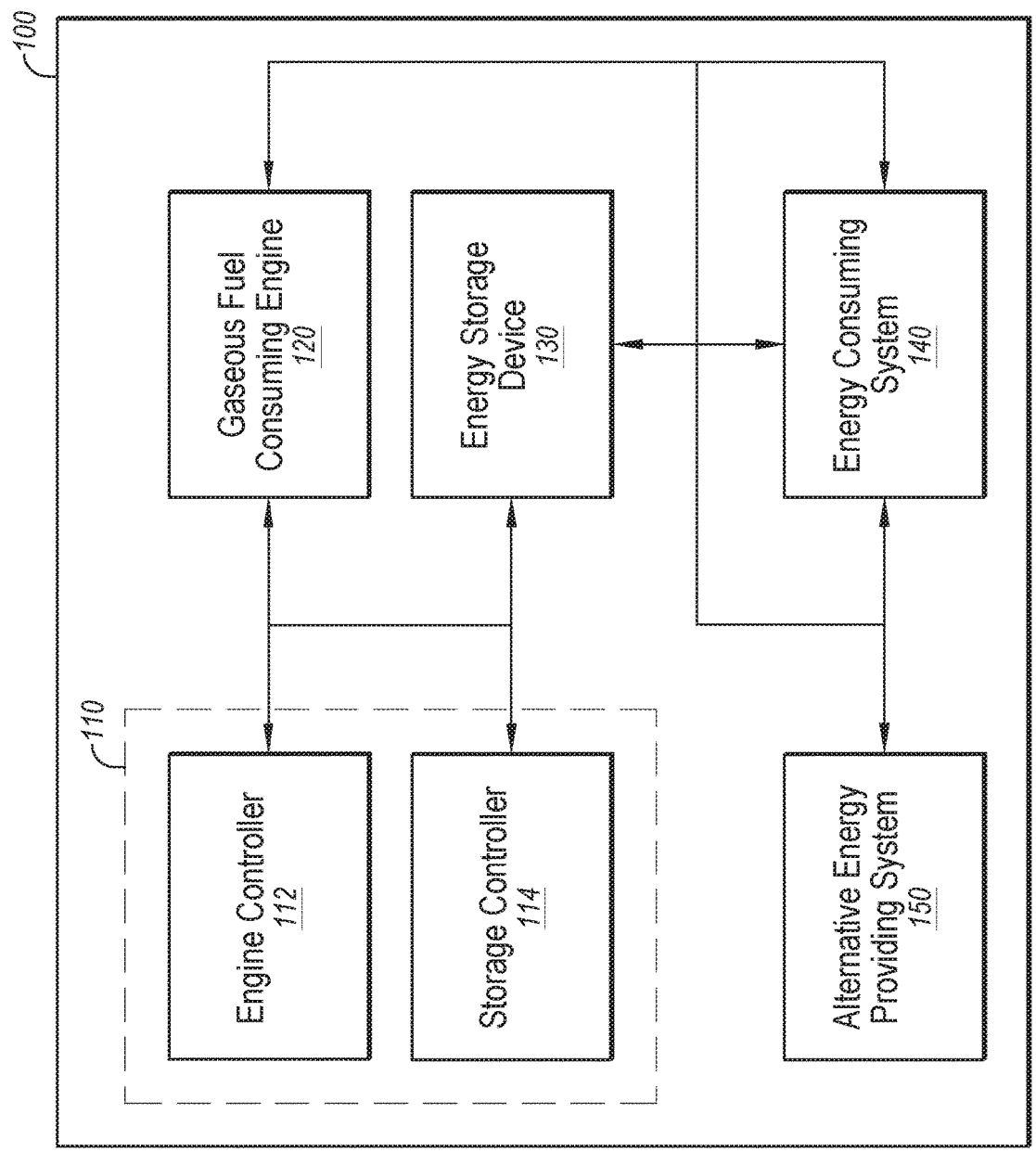
FIG. 1 is a block diagram representing an example system for controlling a gaseous fuel consuming engine.

Some gaseous fuel consuming engines (e.g., natural gas engines) may control operation of the engine with single input single output (SISO) controllers, such as a proportional-integral-derivative (PID) controller, one operating on an individual input parameter and an individual output parameter in a closed loop. For example, a single PID controller may receive the speed of the engine as an input, and may control the throttle valve to control the speed. A separate closed loop with a single PID controller may receive the air to fuel ratio (AFR) of the engine and may control the trim valve to control the AFR. However, because they are separate closed loops, when a transient event (e.g., an event that causes a rapid and large deviation in power demand on the engine, either positive or negative) occurs, the engine may deprioritize the AFR control loop and modify the speed to account for the change in load until the engine is operating at the higher output, after which the AFR control loop may be reengaged. Such a control approach may result in wide speed and AFR variations during transient events. Additionally, such engines may have a slow response to variations in load.

If the engine is supplying alternating current (AC) electricity, for example, in a self-contained power generating system (e.g., a microgrid), an excess of power in the grid may cause increases in frequency and a deficiency of energy in the grid may cause decreases in frequency. Thus, if a transient event occurs that requires a large increase in power, the immediate deficiency in the self-contained power generating system may cause a drop in frequency, and if a transient event occurs where a large demand for power is suddenly removed, the excess power in the self-contained power generating system may cause a spike in frequency. For some AC electricity generators (e.g., synchronous generators), speed may be directly related to frequency and speed deviations may directly result in frequency variations. Variations in frequency may cause protection systems to sense faults and open breakers, causing a loss of power to the grid. Thus, such engines may be ineffective to provide AC electricity because any transient event may cause the power supply to be unavailable. For example, in some embodiments, the self-contained power generating system may operate at or around a standard frequency, such as at approximately fifty hertz or at approximately sixty hertz. The present disclosure may relate to gaseous fuel consuming engine control systems. In some embodiments, rather than closed loop SISO controllers, a multi input multi output (MIMO) controller may be used. The MIMO controller may monitor both speed and AFR of a gaseous fuel consuming engine, and may provide a coordinated modification of the throttle valve and the trim valve of the engine. By providing a coordinated approach, variations in speed and AFR may be mitigated when responding to the sudden increase or decrease in load caused by a transient event.

In some embodiments, an energy storage device (e.g., a battery) may be coupled to a gaseous fuel consuming engine to provide a rapid response to transient events. As the gaseous fuel consuming engine responds to the load, energy in the energy storage device may be supplied to the grid or removed from the grid to balance power demand from loads and/or power supplied by the gaseous fuel consuming engine. The storage controller may monitor both state of charge (SOC) of the energy storage device and the speed of the engine, and may coordinate the rate of discharge or recharge of the energy storage device to facilitate the engine maintaining a relatively constant speed. In these and other embodiments, the storage controller and the engine controller may be used in a single power grid. Additionally or alternatively, a single controller may be used to monitor all of the inputs (e.g., speed and AFR of the gaseous fuel consuming engine and SOC of the energy storage device) and provide a coordinated modification of all of the outputs (e.g., throttle valve and trim valve of the engine and discharge/recharge rate of the energy storage device) to mitigate variations in speed, AFR, and/or SOC.

Embodiments of the present disclosure are explained with reference to the accompanying drawings.

FIG. 1 is a block diagram representing an example system 100 for controlling a gaseous fuel consuming engine 120. The system 100 may include a controller 110 that may include one or both of an engine controller 112 and a storage controller 114. The system 100 may additionally include the gaseous fuel consuming engine 120, an energy storage device 130, an energy consuming system 140, and an alternative energy providing system 150. The gaseous fuel consuming engine 120, the energy storage device 130, and/or the alternative energy providing system 150 may contribute energy to the system 100, and the energy consuming system 140 may utilize the energy provided by the system 100. The controller 110 may monitor multiple parameters of operation of the system 100, for example, a speed of the gaseous fuel consuming engine 120, an air to fuel ratio (AFR) of the gaseous fuel consuming engine 120, and/or a state of charge (SOC) of the energy storage device 130. Based on one or more of these parameters, the controller 110 may modify one or more aspects of the system 100, for example, a throttle valve of the gaseous fuel consuming engine 120, a trim valve of the gaseous fuel consuming engine 120, and/or a discharge rate of the energy storage device 130. The controller 110 may make such modifications in a coordinated manner to maintain one or more of the parameters of operation of the system 100, for example, the speed of the gaseous fuel consuming engine 120, the AFR of the gaseous fuel consuming engine 120, and/or the state of charge of the energy storage device 130.

The system 100 may include any combination of systems, components, and/or devices to provide energy and control the generation and distribution of that energy. In some embodiments, the system 100 may include a self-contained power generating system, such as a microgrid. Such a self-contained power generating system may be used in a variety of circumstances, such as mining sites, fracking operations, oil and gas industry sites, military bases, or any other circumstance in which variations in load may be experienced and/or emissions may be a concern. The present disclosure is not limited to these examples, and merely provides examples of some circumstances in which principles of the present disclosure may be utilized.

The controller 110 may include any combination of systems, components, and/or devices to control operation of one or more components of the system 100. For example, the controller 110 may be configured to control operation of the gaseous fuel consuming engine 120, the energy storage device 130, or both. Additionally or alternatively, the controller 110 may control other components of the system 100. In some embodiments, the controller 110 may include an engine controller 112 and/or a storage controller 114. In some embodiments, the engine controller 112 may monitor and/or control operation of the gaseous fuel consuming engine 120. The engine controller 112 may monitor a speed of the gaseous fuel consuming engine 120 and an AFR of the gaseous fuel consuming engine 120. The engine controller 112 may include mathematical or other relationships between any of speed, AFR, throttle valve, and trim valve. Based on these relationships, the engine controller 112 may be configured to direct a coordinated modification of both the throttle valve and the trim valve of the gaseous fuel consuming engine 120 based on a predetermined goal of the engine controller 112. For example, if the predetermined goal was biased towards maintaining the speed of the gaseous fuel consuming engine while also mitigating AFR deviations, the coordinated modification of the throttle valve and the trim valve may be made in an effort to meet the predetermined goal. For example, if a transient event occurred in the system 100 that required additional power, both the throttle valve and the trim valve may be modified in a coordinated manner to mitigate variations in speed while the gaseous fuel consuming engine 120 increased output to address the increased load. In these and other embodiments, the relationships may be determined and/or defined based on the predetermined goal.

In some embodiments, the predetermined goal may include maintaining any of the operating parameters of the system 100 within a target deviance or a specified range. For example, the predetermined goal may include maintaining a speed of the gaseous fuel engine 120 within a target deviance. In such an example, if the gaseous fuel consuming engine 120 is operating at fifteen hundred revolutions per minute (rpm), the predetermined goal may include maintaining the speed of the fuel consuming engine 120 within ten percent of the speed of fifteen hundred rpm. As another example, the predetermined goal may include maintaining an AFR of the gaseous fuel consuming engine 120 within a target deviance. In such an example, if controlling emissions is a large concern, the predetermined goal may maintain the AFR of the gaseous fuel consuming engine 120 within an optimum operating range such that the gaseous fuel consuming engine 120 does not burn rich or lean. In some embodiments, the predetermined goal may include both the speed and the AFR, and may weight one more than the other (e.g., maintaining the speed may be weighted more heavily than maintaining the AFR). In some embodiments, the predetermined goal may include maintaining an operating frequency of the system 100 at approximately sixty hertz. While fifteen hundred rpm is provided as an example, any type of engine and any engine speed is contemplated within the scope of the present disclosure. For example, if operating at sixty hertz, the engine may operate at any multiple of sixty (e.g., fifteen hundred rpm), and if operating at fifty hertz, the engine may operate at any multiple of fifty (e.g., eighteen hundred rpm).

In some embodiments, the storage controller 114 may monitor and/or control operation of the energy storage device 130 and/or the gaseous fuel consuming engine 120. For example, the storage controller 114 may monitor the speed of the gaseous fuel consuming engine 120 and a state of charge (SOC) of the energy storage device 130. The storage controller 114 may include mathematical or other relationships between any of speed of the gaseous fuel consuming engine 120, the SOC of the energy storage device 130, and a rate of discharge/recharge of the energy storage device 130. Based on these relationships, the storage controller 114 may be configured to modify the rate of discharge/recharge of the energy storage device 130 based on a predetermined goal of the storage controller 114. For example, if the predetermined goal was biased towards maintaining the speed of the gaseous fuel consuming engine 120, the rate of discharge of the energy storage device 130 may be modified in an effort to meet the predetermined goal. For example, if a transient event occurred in the system 100 that required additional power, the rate of discharge of the energy storage device 130 may be modified to mitigate variations in speed while the gaseous fuel consuming engine 120 increased output to address the increased load. In these and other embodiments, the relationships may be determined and/or defined based on the predetermined goal.

As described above, the predetermined goal may include any of the operating parameters of the system 100 and may include maintaining the SOC of the energy storage device 130 at or near a target SOC. For example, the predetermined goal may include maintaining the SOC at or approximately fifty percent. In some embodiments, the target deviance for the SOC may include one, two, three, five, ten, twenty, thirty, or forty percent variation from the target SOC.

In some embodiments, the rate of discharge/recharge of the energy storage device 130 may be controlled by a command current signal. For example, a positive command current signal from the storage controller 114 to the energy storage device 130 may cause the energy storage device 130 to discharge energy (e.g., provide energy to the system 100) at a rate proportional to the positive command current signal. Additionally or alternatively, a negative command current signal from the storage controller 114 to the energy storage device 130 may cause the energy storage device 130 to recharge (e.g., draw energy away from the system 100) at a rate proportional to the negative command current signal. A zero command current signal may cause the energy storage device 130 to neither discharge or recharge.

In some embodiments, for example, as illustrated in FIG. 1, the engine controller 112 and the storage controller 114 may be implemented as separate controllers but may operate in a coordinated manner when the engine controller 112 and the storage controller 114 may be communicatively compatible. For example, if both controllers are manufactured by the same company, communicate using a standardized protocol or message format, or are otherwise capable of intercommunication the two controllers may be communicatively compatible. In these and other embodiments, modification of the throttle valve, the trim valve, and the rate of discharge of the energy storage device 130 may be coordinated. For example, the coordinated modification may be based on the speed of the gaseous fuel consuming engine 120, the air to fuel ratio of the gaseous fuel consuming engine 120, and the state of charge of the energy storage device 130 when the engine controller 112 and the storage controller 114 are communicatively compatible. Additionally or alternatively, when communicatively compatible, the engine controller 112 and the storage controller 114 may operate as though they were a single MIMO controller. In implementation, the controller 110 may include a general purpose computation device, or may include a special purpose device configured specifically for operation in the system 100. The controller 110 may include a processor region and a memory region. The processor region may include any suitable special-purpose or general-purpose computer, computing entity, or processing device including various computer hardware or software modules and may be configured to execute instructions stored on any applicable computer-readable storage media, such as the memory region. For example, the processor region may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The processor region may include any number of processors configured to perform, individually or collectively, any number of operations described in the present disclosure. Additionally, one or more of the processors may be present on one or more different electronic devices, such as different devices coupled together or communicating remotely. In some embodiments, the processor region may interpret and/or execute program instructions and/or process data stored in the memory region. In some embodiments, the processor region may fetch program instructions and load the program instructions in the memory region. After the program instructions are loaded into the memory region, the processor region may execute the program instructions. In some embodiments, the execution of instructions by the processor region may direct and/or control the operation of the system 100. For example, the processor region may instruct a throttle valve or a trim valve of the gaseous fuel consuming engine 120 to be modified.

The memory region may include computer-readable storage media for carrying or having computer-executable instructions or data structures stored thereon. Such computer-readable storage media may include any available media that may be accessed by a general-purpose or special-purpose computer, such as the processor region. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), hard disk drives (HDD), solid state drives (SSD), or any other storage medium which may be used to carry or store desired program code in the form of computer-executable instructions or data structures and which may be accessed by a general-purpose or special-purpose computer. The computer-readable storage media may be configured as a stand-alone media or as part of some other system, component, or device. The computer-readable storage media may be configured as a physical media or as a virtualized media. Combinations of any of the above may also be included within the scope of computer-readable storage media. Computer-executable instructions may include, for example, instructions and data configured to cause the processor region to perform a certain operation or group of operations.

The gaseous fuel consuming engine 120 may include any engine configured to provide power based on combustion of a gaseous fuel. The gaseous fuel consuming engine 120 may be configured to provide electricity, mechanical power, or any other type of power. The gaseous fuel consuming engine 120 may include a natural gas combusting engine, a propane fuel combusting engine, producer gas combusting engine, anaerobic digester gas combusting engine, or any other gaseous fuel combusting engine. In some embodiments, the gaseous fuel consuming engine 120 may have a relatively slow response to variations in load required of the gaseous fuel consuming engine 120 when compared to responses that may be made by the energy storage device 130. While illustrated as a single engine, any number of engines may be utilized and may operate and be controlled as a single engine or may operate and be controlled independently.

The energy storage device 130 may include any number of devices, components, systems, or combinations thereof configured to store and release energy. For example, the energy storage device 130 may include mechanical or potential energy storage (e.g., pneumatic, compressed air, flywheels, etc.), chemical storage (e.g., any of a variety of batteries or fuel cells, including lithium-based batteries, nickel-based batteries, lead-based batteries, etc.), electrical storage (e.g., capacitors, supercapacitors, etc.), or any combinations thereof. In some embodiments, the energy storage device 130 may be configured to provide power to the system 100 when a transient event occurs that demands additional power, and may withdraw power from the system 100 when a transient event occurs that removes a portion of the previously-utilized power.

The energy consuming system 140 may include any number of devices, components, systems, or combinations thereof that may utilize the energy provided by the system 100. In some embodiments, the energy consuming system 140 may cause a transient event by engaging or disengaging a certain component of the energy consuming system 140. For example, if the energy consuming system 140 includes a drill, when the drill is turned on it may cause a transient event because of the large increase in energy consumption. Similarly, after the drill is turned off it may cause another transient event because of the large decrease in energy consumption. While one example is provided, any number or variety of other components or devices may be part of the energy consuming system 140 and may cause transient events.

The alternative energy providing system 150 may include any number of devices, components, systems, or combinations thereof that may provide energy to the system 100 in a form different from the gaseous fuel consuming engine 120. For example, the alternative energy providing system 150 may include a solar power generating device, a wind power generating device, a biogas power generating device, a hydropower generating device, a biomass generating device, etc., or any combinations thereof. The alternative energy providing system 150 may cause transient events. For example, if the alternative energy providing system 150 includes a wind power generating device and the wind has been blowing strongly producing a large amount of energy and the wind suddenly dies, there may be a very rapid decrease in the amount of available energy in the system 100. Similarly, if a strong wind began blowing, the system 100 may experience a very rapid increase in the amount of available energy in the system 100. As another example, if the alternative energy providing system 150 includes a solar power generating device and it has been very sunny producing a large amount of energy and the sun suddenly goes behind a large bank of clouds, there may be a very rapid decrease in the amount of available energy in the system.

Similarly, if the sun has been behind dark clouds and then comes out from behind the clouds, the system 100 may experience a very rapid increase in the amount of available energy in the system 100.

In some embodiments, the present disclosure may accommodate transient events from either the energy consuming system 140 or the alternative energy providing system 150. By accommodating transient events from a variety of sources, the present disclosure may facilitate the use of renewable energy sources that may otherwise provide too much variation to be used in some circumstances. In some embodiments, the transient events may cause a large change in the energy consumption of the system 100. For example, a transient event may cause a change in the load on the system 100 by a predetermined amount (e.g., ten, twenty, thirty, forty, fifty, sixty, seventy, eighty, ninety, or one hundred percent). In some embodiments, the transient event may cause a change in the load on the system 100 in excess of one hundred percent Modifications, additions, or omissions may be made to the system 100 without departing from the scope of the present disclosure. For example, in some embodiments, the system 100 may include any number of other components that may not be explicitly illustrated or described. As another example, the controller 110 may be in communication with any of the components of the system 100, and may take any of a variety of inputs from the system 100 in controlling the operation of the system 100. As another example, the controller 110 may take any of a variety of embodiments, such as those illustrated in FIGS. 2A-2C. As another example, the system 100 may not include the engine controller 112, the storage controller 114, the energy storage device 130, and/or the alternative energy providing system 150.

Figure 2A:
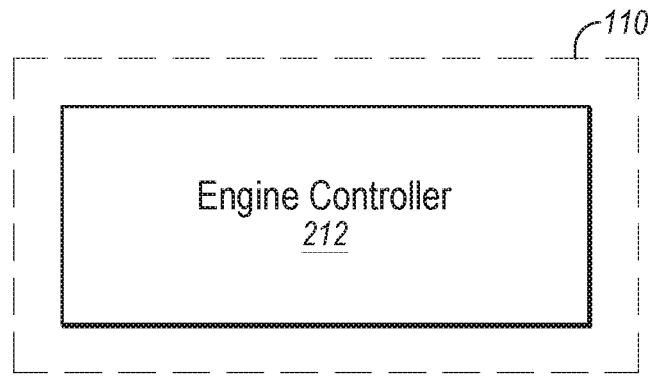
FIG. 2A is a block diagram representing one example of a controller for controlling a gaseous fuel consuming engine.
Figure 2B:
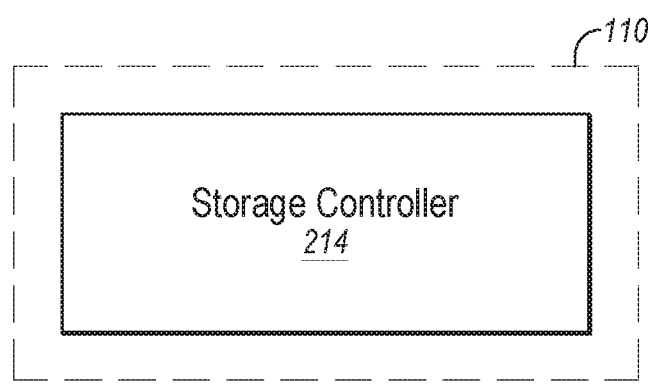
FIG. 2B is a block diagram representing one example system of a controller for controlling an energy storage device.
Figure 2C:
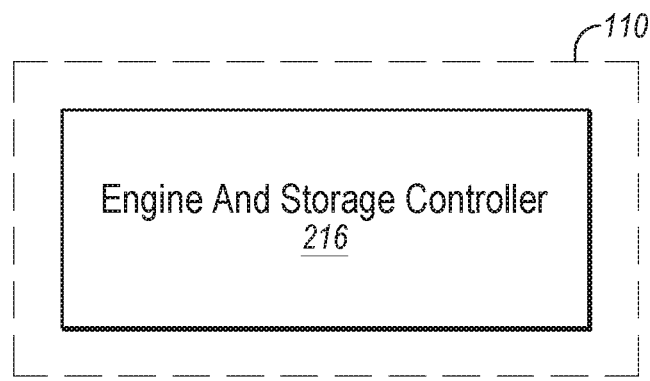
FIG. 2C is a block diagram representing another example of a controller for controlling a gaseous fuel consuming engine and an energy storage device.

FIGS. 2A-2C illustrate various example embodiments of the controller 110 of FIG. 1. As described above, FIG. 1 illustrates an embodiment of the controller 110 that may include both the engine controller 112 and the storage controller 114, FIG. 2A illustrates an embodiment of the controller 110 that may include an engine controller 212 but not a storage controller, FIG. 2B illustrates an embodiment of the controller 110 that may include a storage controller 214 but not an engine controller, and FIG. 2C illustrates an embodiment of the controller 110 that may include an engine and storage controller 216. Each of the embodiments of the controller 110 illustrated in FIGS. 2A-2C may operate based on a predetermined goal for the controller 110, and may include one or more relationships between various parameters to accomplish that goal.

The engine controller 212 may operate and be implemented in a similar manner to the engine controller 112 of FIG. 1. As described above, the engine controller 212 may operate as a MIMO controller, monitoring speed and AFR of a gaseous fuel consuming engine (such as the gaseous fuel consuming engine 120 of FIG. 1) and may control a throttle valve and a trim valve of the gaseous fuel consuming engine in a coordinated manner. For example, the engine controller 212 may modify both the throttle valve and the trim valve to maintain the speed of the engine within a target deviance in response to a transient event. In these and other embodiments, the system 100 of FIG. 1 may or may not include an energy storage device.

The storage controller 214 may operate and be implemented in a similar manner to the storage controller 114 of FIG. 1. As described above, the storage controller 214 may monitor the speed of a gaseous fuel consuming engine (such as the gaseous fuel consuming engine 120 of FIG. 1) and the SOC of an energy storage device (such as the energy storage device 130 of FIG. 1) and may control a rate of discharge/recharge of the energy storage device. For example, the storage controller 114 may provide a positive current command signal in response to a transient event that provides an additional load and may provide a negative current command signal in response to a transient event that removes a load.

The engine and storage controller 216 may operate and be implemented in a similar manner to the engine controller 112 and the storage controller 114 of FIG. 1 when they are communicatively compatible. In some embodiments, the engine and storage controller 216 may be implemented as a single controller. In these and other embodiments, the engine and storage controller 216 may monitor the speed and AFR of a gaseous fuel consuming engine (e.g., the gaseous fuel consuming engine 120 of FIG. 1) and the SOC of an energy storage device (e.g., the energy storage device 130 of FIG. 1). The engine and storage controller 216 may control a throttle valve and a trim valve of the gaseous fuel consuming engine and may control the rate of discharge/recharge of the energy storage device. In some embodiments, the control may be based on one or more relationships between any of the speed, the AFR, the SOC, the throttle valve, the trim valve, and/or the rate of discharge/recharge. In these and other embodiments, the coordinated modification of any of the throttle valve, the trim valve, and/or the rate of discharge/recharge may maintain the speed, the AFR, and/or the SOC.

Figure 3:
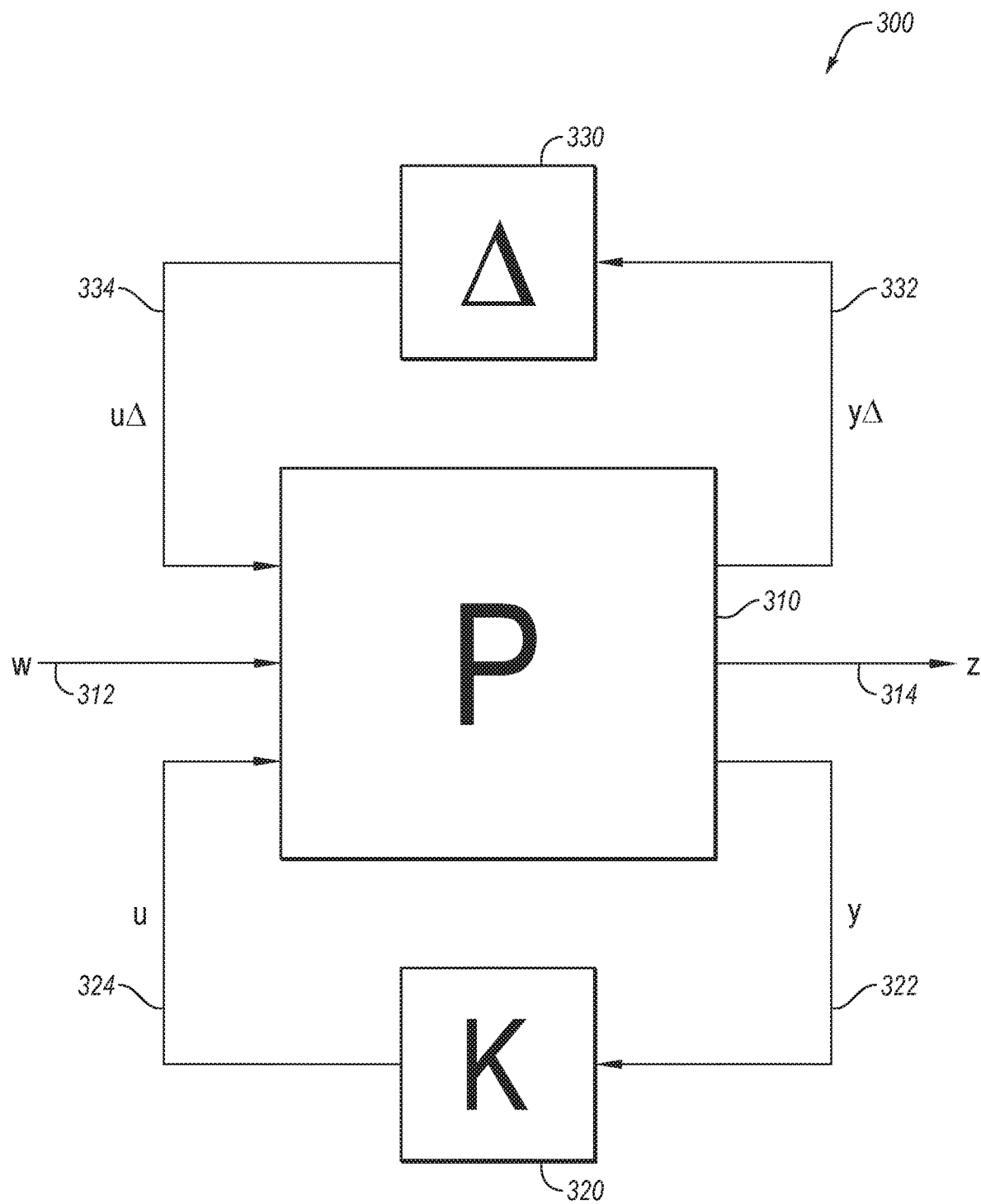
FIG. 3 is a block diagram representing an example model for providing a controller for controlling a gaseous fuel consuming engine.

Modifications, additions, or omissions may be made to the controller 110 illustrated in FIGS. 2A-2C without departing from the scope of the present disclosure. For example, in some embodiments, the controller 110 may include any number of other components that may not be explicitly illustrated or described. As another example, the controller 110 may receive other inputs and may control other parameters besides those mentioned above. For example, the controller 110 may monitor and/or control any of spark timing, cylinder firing rate, catalytic converter controls, emission rates, battery temperature, etc. FIG. 3 is a block diagram representing an example model 300 for providing a controller (e.g., the controller 110 of FIGS. 1 and 2A-2C) for controlling a gaseous fuel consuming engine (e.g., the gaseous fuel consuming engine 120 of FIG. 1). The model 300 may be used to determine relationships between various features of a system (e.g., the system 100 of FIG. 1) for the controller to utilize in controlling the gaseous fuel consuming engine.

The model 300 may include a map 310 (labeled as P) that maps interconnections between various aspects of the system being modeled. For example, the map 310 may model what parameters are monitored by the controller, what parameters may disturb or otherwise modify operation of the engine, what parameters the controller may modify, weights to be given to the various modeled values, what parameters may be outputs of the model, etc. The model may also include one or more input parameters 312 (labeled as w) which may include parameters monitored by the controller and may also include other disturbances which may modify operation of the system. Such input parameters may include, for example, engine speed, engine AFR, energy storage device SOC, noise signal, and a load on the system. The model 300 may also include outputs 314 (labeled as z), which may include one or more operational parameters of the system, each of which may be individually weighted. For example, output parameters 314 may include engine speed, AFR of the engine, operating ranges within which the speed and AFR may fall, SOC, energy storage device power output, the controller 320 control signals (e.g., signals from the controller 320 to the throttle valve, trim valve, and/or battery charge/discharge may be penalized to prevent the controller 320 from using excessively large control signals), and/or the load carried by the energy storage device. In some embodiments, the weighting may vary by frequency. For example, a particular speed may be weighted a certain amount at one frequency of change of the engine, but may be weighted a second amount at another frequency of change of the engine. For example, the speed may be penalized with a rapid frequency of change and the speed may be less penalized with a slow frequency of change. As another example, the rate of discharge/recharge may be weighted a first amount for a first low frequencies (e.g., slow rates of discharge/recharge), and weighted by a second larger amount for high frequencies (e.g., fast rates of discharge/recharge). In some embodiments, the weighting of one or more of the variables may facilitate a predetermined goal of the controller. For example, if the goal is to emphasize maintaining speed of the gaseous fuel consuming engine, the speed output may be weighted more heavily than other outputs.

The model 300 may include the controller 320 (e.g., the controller 110 of FIGS. 1 and 2A-2C). The model may also include inputs to the controller 322 (labeled as y) and outputs of the controller 324 (labeled as u). By way of example, the inputs to the controller 322 may include engine speed, AFR, and SOC. Examples of the outputs of the controller 324 may include modifications of the throttle valve, the trim valve, and the rate of discharge/recharge of an energy storage device (e.g., the energy storage device 130 of FIG. 1).

The model 300 may also include uncertainties 330 (labeled as 4), which may model any of a variety of factors that may be uncertain in the system. For example, some uncertainty may be based on operation of the system (operational uncertainty 332, labeled as $\Delta y$) and some uncertainties may be based on monitored parameters of the system (input uncertainty 334, labeled as $\Delta u$).

In some embodiments, after the aspects of the model 300 have been selected, the model 300 may be optimized to determine one or more relationships between various components of the model 300. For example, a relationship between operation of the trim valve and the throttle valve may be determined such that the two may be modified in a coordinated manner. One or more of those relationships determined in the model 300 may be utilized in a physical controller to monitor and control the operation of a physical system. In some embodiments, various potential transient events that may be experienced based on the location in which the controller is expected to operate may be utilized in optimizing the model 300. For example, if large variations of approximately fifty percent change in load are expected, such variations may be included in optimizing the model 300.

In some embodiments, transient events may be modeled to determine a threshold energy storage device size. For example, operation of the controller 320 may be modelled to determine variations based on the energy storage device. For larger variations in transient events, a larger energy storage device capacity may be required.

Modifications, additions, or omissions may be made to the model 300 illustrated in FIG. 3 without departing from the scope of the present disclosure. For example, in some embodiments, the model 300 may include any number of other components that may not be explicitly illustrated or described. As another example, the model 300 may limit or otherwise penalize one or more aspects of the model to fit within operating boundaries (e.g., a throttle valve may only be able to change at a certain range of rates, and changes outside of that range may be penalized or prevented). As an additional example, the model 300 may be arranged to model any of the embodiments of the controller 110 described in FIGS. 1 and 2A-2C.

Figure 4A:
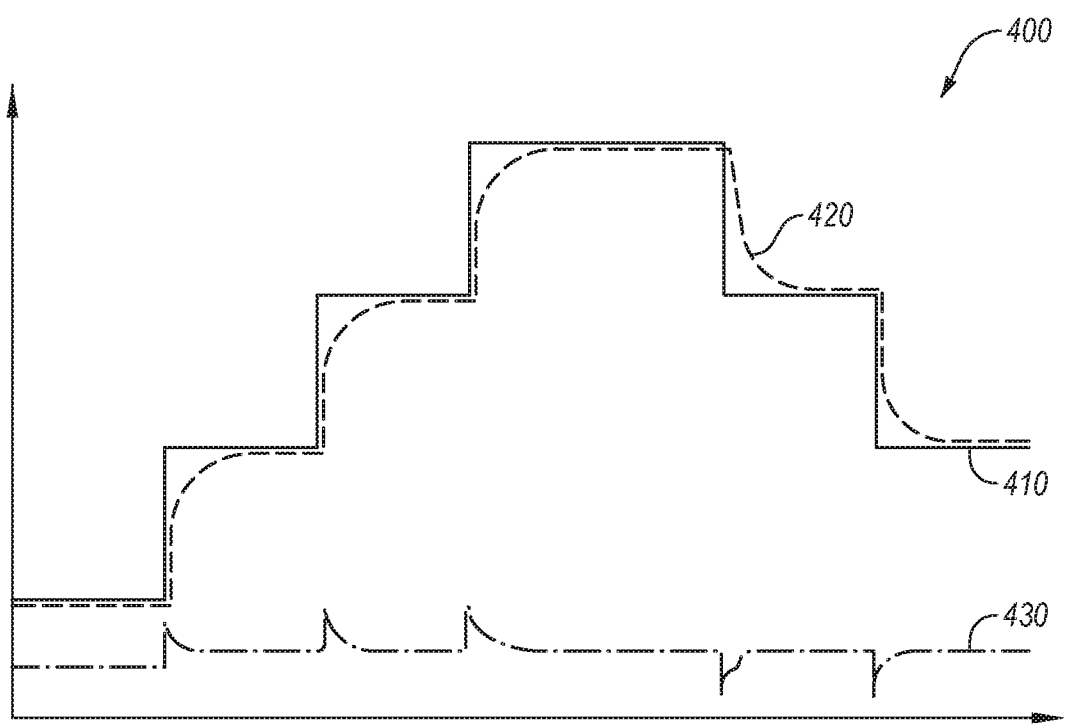
FIG. 4A illustrates an example plot illustrating operation of a gaseous fuel consuming engine and an energy storage device.

FIG. 4A illustrates an example plot 400 illustrating operation of a gaseous fuel consuming engine and an energy storage device (e.g., the gaseous fuel consuming engine 120 and the energy storage device 130 of FIG. 1) when operating in a system (e.g., the system 100 of FIG. 1), in accordance with at least one embodiment of the present disclosure. The plot 400 may include a solid line 410 representing the load in the system as time progresses, a dashed line 420 representing the power output of the gaseous fuel consuming engine as time progresses, and a dashed and dotted line 430 representing the power output of the energy storage device as time progresses.

As illustrated in FIG. 4A, as an increase in the load is experienced in the system (e.g., a transient event that adds an additional load to the system) as illustrated by the steps up in the solid line 410, the gaseous fuel consuming engine may begin to increase its output to handle the increased load, as illustrated by the curve upward of the dashed line 420. However, the response may not immediately handle the entire increased load. For example, the gaseous fuel consuming engine may have a relatively slow response to large changes in load. In some embodiments, this gradual change may be caused by a controller (e.g., the controller 110 of FIGS. 1 and 2A-2C). In these and other embodiments, the controller may regulate the response of the gaseous fuel consuming engine such that it is a gradual response such that the speed of the gaseous fuel consuming engine may be maintained within a target deviance.

As also illustrated in FIG. 4A, as the increase in the load is experienced in the system, the energy storage device may have a rapid response to the increased load, as illustrated by the spike in the dashed and dotted line 430. As the output of the gaseous fuel consuming engine increases, there may be a correlated decrease in the discharge rate of the energy storage device, as illustrated in the gradual decline of the dotted and dashed line 430.

As illustrated in FIG. 4A, as a decrease in the load is experienced in the system (e.g., a transient event that removes a load from the system) as illustrated by the steps down in the solid line 410, the gaseous fuel consuming engine may being to decrease its output to stop adding energy to the system, as illustrated by the curve downward of the dashed line 420. However, the response may not immediately remove all of the excess energy from the system. As described above, this may be the result of a slow response controlled by the controller.

As also illustrated in FIG. 4A, as the decrease in the load is experienced in the system, the energy storage device may have a rapid response to the increased load, as illustrated by the drop in the dashed and dotted line 430. The drop may represent the energy storage device recharging and absorbing energy from the system. As the output of the gaseous fuel consuming engine gradually decreases, there may be a correlated decrease in the recharge rate of the energy storage device, as illustrated by the gradual increase of the dotted and dashed line 430.

Figure 4B:
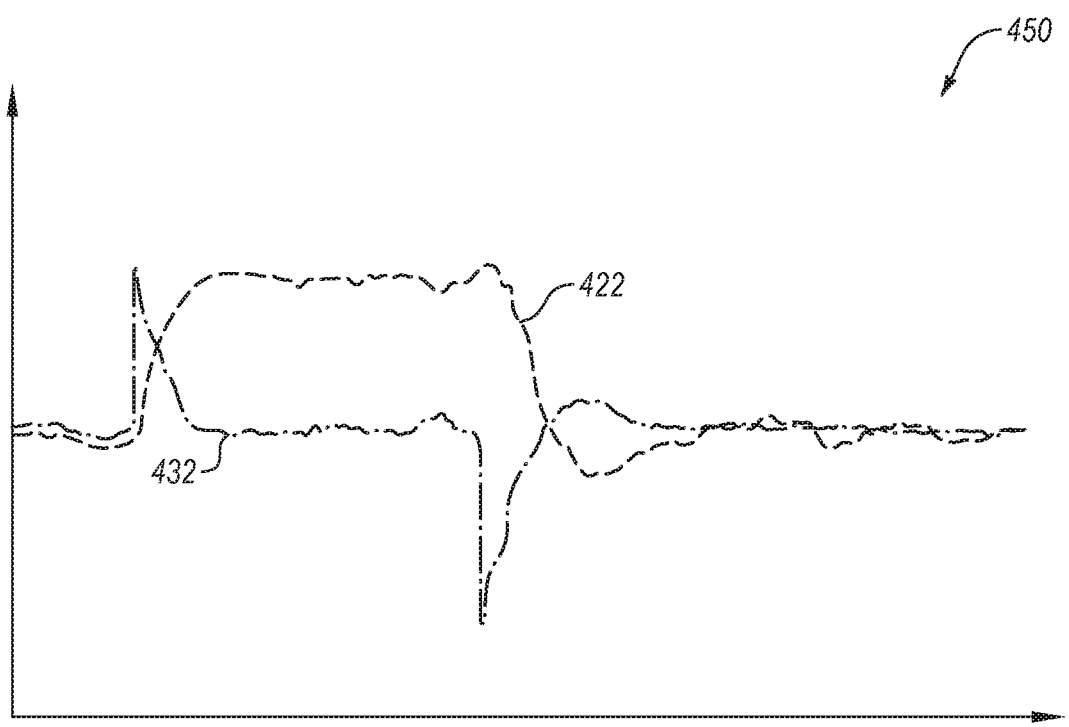
FIG. 4B illustrates another example plot illustrating operation of a gaseous fuel consuming engine and an energy storage device.

FIG. 4B illustrates another example plot 450 illustrating operation of a gaseous fuel consuming engine and an energy storage device. The dashed line 422 may represent the power output of the gaseous fuel consuming engine as time progresses, and the dotted and dashed line 432 may represent the power output of the energy storage device as time progresses. The plot 450 may illustrate the hand-off transition between the gaseous fuel consuming engine and the energy storage device. To illustrate the hand-off, the plot 450 may not use the same range along the y-axis so as to overlay the dashed line 422 and the dotted and dashed line 432 for illustrative purposes. For example, the curves 422 and 432 may provide an alternative view to the curves 420 and 430 of FIG. 4A.

As illustrated in FIG. 4B, as the energy storage device discharge rate spikes in response to a load, the output of the gaseous fuel consuming engine may begin to increase. As the gaseous fuel consuming engine output increases, the hand-off occurs such that a corresponding decrease is observed in discharge from the energy storage device. Similarly, as the energy storage device recharge rate spikes (e.g., a sudden drop in the dotted and dashed line 432), the output of the gaseous fuel consuming engine may begin to decrease. As the gaseous fuel consuming engine output decreases, the hand-off occurs such that a corresponding decrease is observed in recharge from the energy storage device. In some embodiments, the energy storage device may also respond to any overshoot of the gaseous fuel consuming engine. Additionally, as small or slow variations occur in the load, the energy storage device may mirror the gaseous fuel consuming engine. In these and other embodiments, a controller may control a throttle valve, a trim valve, and/or a rate of discharge/recharge to provide a coordinated response to any variations in load of the system consistent with a predetermined goal. For example, the coordinated response may maintain speed of the gaseous fuel consuming engine within a target deviance.

In some embodiments, during a first portion of a transient event, the energy storage device may discharge power. For example, an initial spike of energy input from the energy storage device may occur immediately after a transient event has occurred. During a second portion of a transient event, the energy storage device may decrease the rate at which energy is discharged. For example, the energy storage device may decrease its discharge rate as the gaseous fuel consuming engine catches up to the additional load in the system. During a third portion of the transient event, the energy storage device may recharge. For example, the gaseous fuel consuming device may overshoot the load requirement and the energy storage device may absorb any excess energy produced in the overshoot. Additionally or alternatively, the energy storage device may impose a small demand on the system such that the gaseous fuel consuming engine may allow the energy storage device to recharge any expended charge during the first and the second portions of the transient event.

Modifications, additions, or omissions may be made to the plots 400 and/or 450 illustrated in FIGS. 4A and 4B without departing from the scope of the present disclosure. For example, in some embodiments, the plots 400 and 450 may be provided purely for illustrative purposes and such plots may not be generated or utilized. Additionally or alternatively, in some embodiments, the system may not include an energy storage device.

Figure 5:
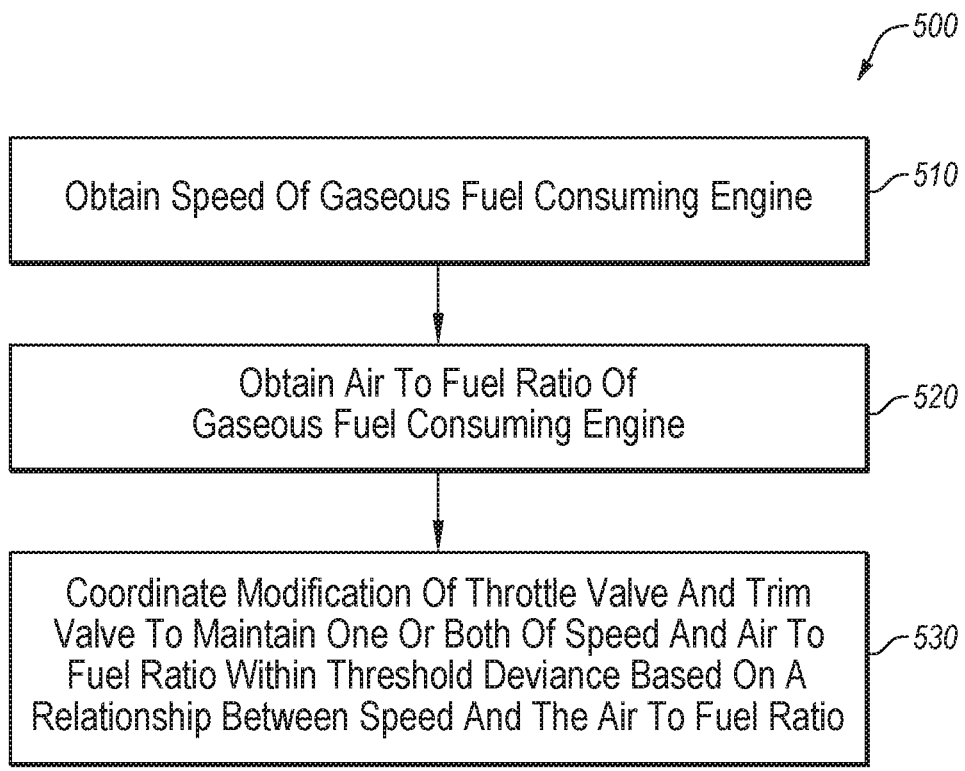
FIG. 5 is a flow diagram of an example method of controlling a gaseous fuel consuming engine.

FIG. 5 is a flow diagram of an example method 500 of controlling a gaseous fuel consuming engine (e.g., the gaseous fuel consuming engine 120 of FIG. 1), in accordance with one or more embodiments of the present disclosure. The method 500 may be performed by any suitable system, apparatus, or device. For example, the controller 110 of FIG. 1, 2A, or 2C, or the system 100 of FIG. 1 may perform one or more of the operations associated with the method 500. Although illustrated with discrete blocks, the steps and operations associated with one or more of the blocks of the method 500 may be divided into additional blocks, combined into fewer blocks, or eliminated, depending on the desired implementation.

At block 510, a speed of a gaseous fuel consuming engine may be obtained. For example, a device such as the controller 110 of FIG. 1 may receive the speed of the gaseous fuel consuming engine from the engine or from a sensor associated with the engine. Additionally or alternatively, a sensor or other monitoring component may be part of the controller 110 and the controller 110 may obtain the speed of the gaseous fuel consuming engine by observing the engine.

At block 520, an AFR of the gaseous fuel consuming engine may be obtained. For example, a device such as the controller 110 of FIG. 1 may receive the AFR of the gaseous fuel consuming engine from the engine or from a sensor associated with the engine. Additionally or alternatively, a sensor or other monitoring component may be part of the controller 110 and the controller 110 may obtain the AFR of the gaseous fuel consuming engine by observing the engine.

At block 530, modification of a throttle valve and a trim valve may be coordinated to maintain one or both of the speed and the AFR of the gaseous fuel consuming engine within a threshold deviance based on a relationship between speed and AFR. For example, during a transient event, the trim valve and the throttle valve may be modified in a coordinated manner to maintain the speed of the engine within a threshold deviance. Accordingly, the method 500 may be used to control a gaseous fuel consuming engine. Modifications, additions, or omissions may be made to the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 6:
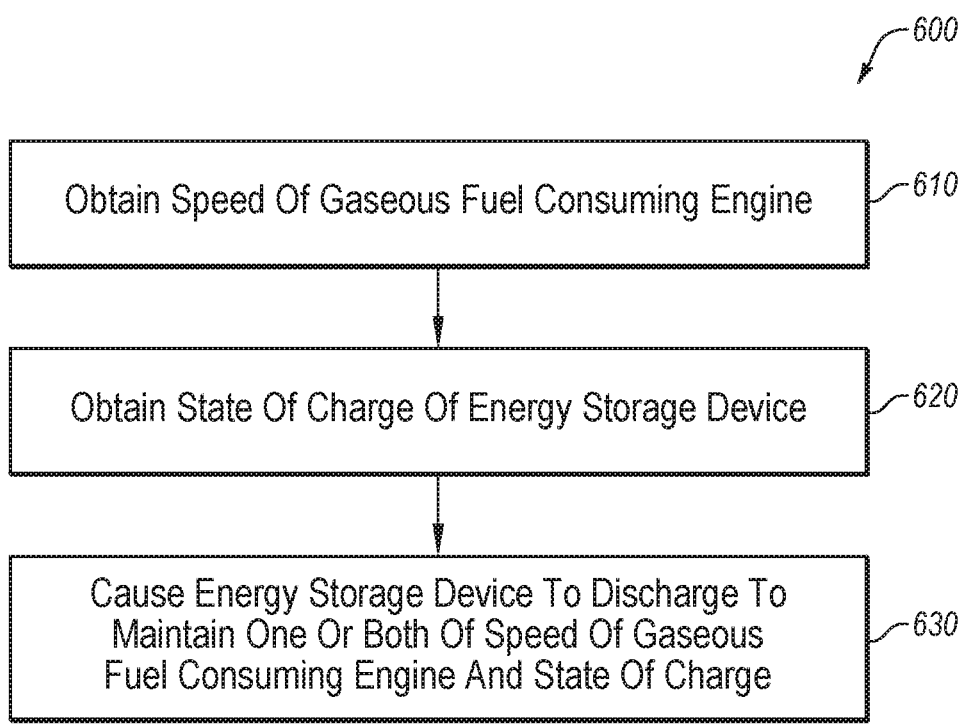
FIG. 6 is a flow diagram of an example method of controlling an energy storage device.

FIG. 6 is a flow diagram of an example method 600 of controlling an energy storage device (e.g., the energy storage device 130 of FIG. 1), in accordance with one or more embodiments of the present disclosure. The method 600 may be performed by any suitable system, apparatus, or device. For example, the controller 110 of FIG. 1, 2B or 2C, or the system 100 of FIG. 1 may perform one or more of the operations associated with the method 600. Although illustrated with discrete blocks, the steps and operations associated with one or more of the blocks of the method 600 may be divided into additional blocks, combined into fewer blocks, or eliminated, depending on the desired implementation.

At block 610, a speed of a gaseous fuel consuming engine (e.g., the gaseous fuel consuming engine 120 of FIG. 1) may be obtained. The block 610 may be similar to the block 510 of FIG. 5.

At block 620, a state of charge (SOC) of the energy storage device may be obtained. For example, a device such as the controller 110 of FIG. 1 may receive the SOC of the energy storage device from the energy storage device or from a sensor associated with the energy storage device. Additionally or alternatively, a sensor or other monitoring component may be part of the controller 110 and the controller 110 may obtain the SOC of the energy storage device by observing the energy storage device.

At block 630, the energy storage device may be caused to discharge energy to maintain one or both of the speed of the gaseous fuel consuming engine and the SOC of the energy storage device. For example, in response to a transient event adding a load to a system, the controller may provide a positive command current to the energy storage device to cause it to discharge energy to supply energy as the output of the gaseous fuel consuming engine is increased to address the additional load. In some embodiments, the controller may cause the discharge to assist in maintaining the speed of the gaseous fuel consuming engine within a target deviance, or consistent with some other predetermined goal.

Accordingly, the method 600 may be used to control an energy storage device. Modifications, additions, or omissions may be made to the method 600 without departing from the scope of the present disclosure. For example, the operations of method 600 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 7:
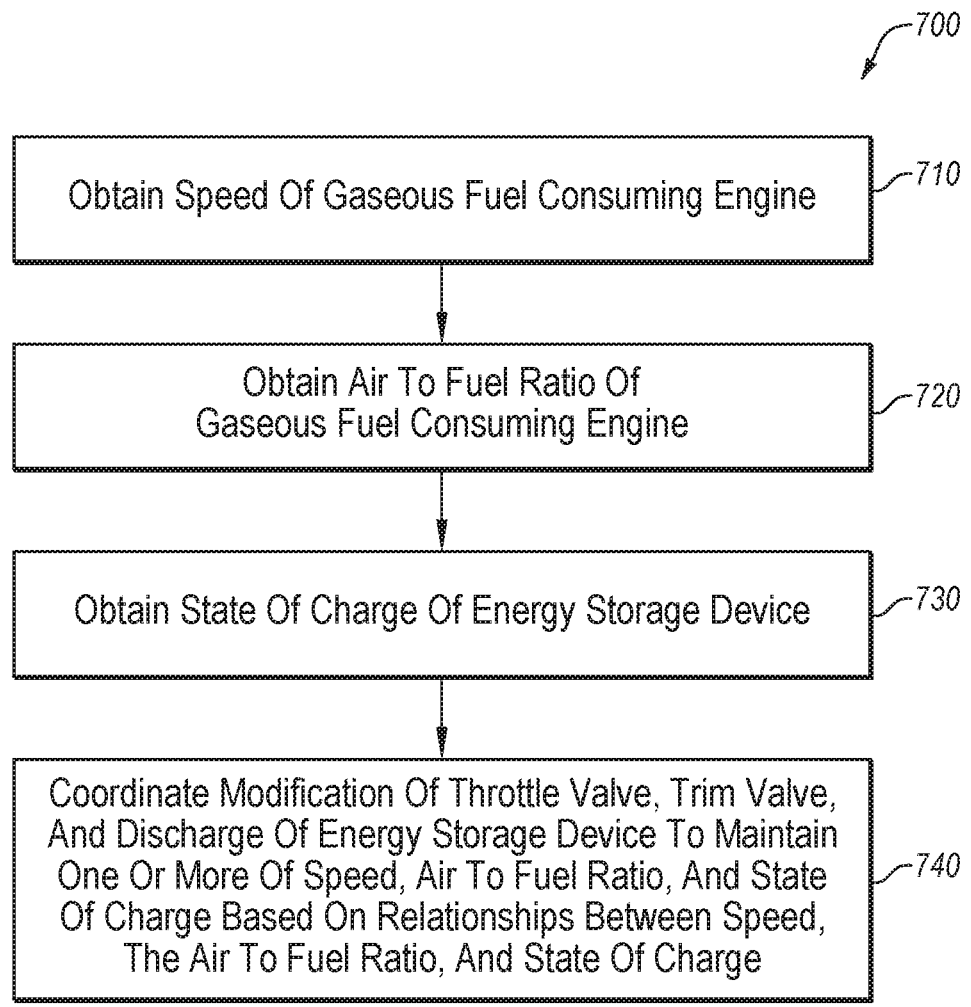
FIG. 7 is a flow diagram of an example method of controlling a gaseous fuel consuming engine and an energy storage device.

FIG. 7 is a flow diagram of an example method 700 of controlling a gaseous fuel consuming engine (e.g., the gaseous fuel consuming engine 120 of FIG. 1) and an energy storage device (e.g., the energy storage device 130 of FIG. 1), in accordance with one or more embodiments of the present disclosure. The method 700 may be performed by any suitable system, apparatus, or device. For example, the controller 110 of FIG. 1 or 2C or the system 100 of FIG. 1 may perform one or more of the operations associated with the method 700. Although illustrated with discrete blocks, the steps and operations associated with one or more of the blocks of the method 700 may be divided into additional blocks, combined into fewer blocks, or eliminated, depending on the desired implementation.

At block 710, a speed of a gaseous fuel consuming engine may be obtained. The block 710 may be similar to the block 510 of FIG. 5.

At block 720, an AFR of the gaseous fuel consuming engine may be obtained. The block 720 may be similar to the block 520 of FIG. 5.

At block 730, an SOC of the energy storage device may be obtained. The block 730 may be similar to the block 620 of FIG. 6.

At block 740, modification of a throttle valve and a trim valve of the gaseous fuel consuming engine and a discharge rate of the energy storage device may be coordinated to maintain one or more of the speed and the AFR of the gaseous fuel consuming engine, and the SOC of the energy storage device based on a relationship between speed, AFR, and state of charge. For example, during a transient event, the trim valve, the throttle valve, and the discharge/recharge rate may be modified in a coordinated manner to maintain the speed of the engine within a threshold deviance, or may be modified consistent with any other predetermined goal.

Accordingly, the method 700 may be used to control a gaseous fuel consuming engine. Modifications, additions, or omissions may be made to the method 700 without departing from the scope of the present disclosure. For example, the operations of method 700 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 8:
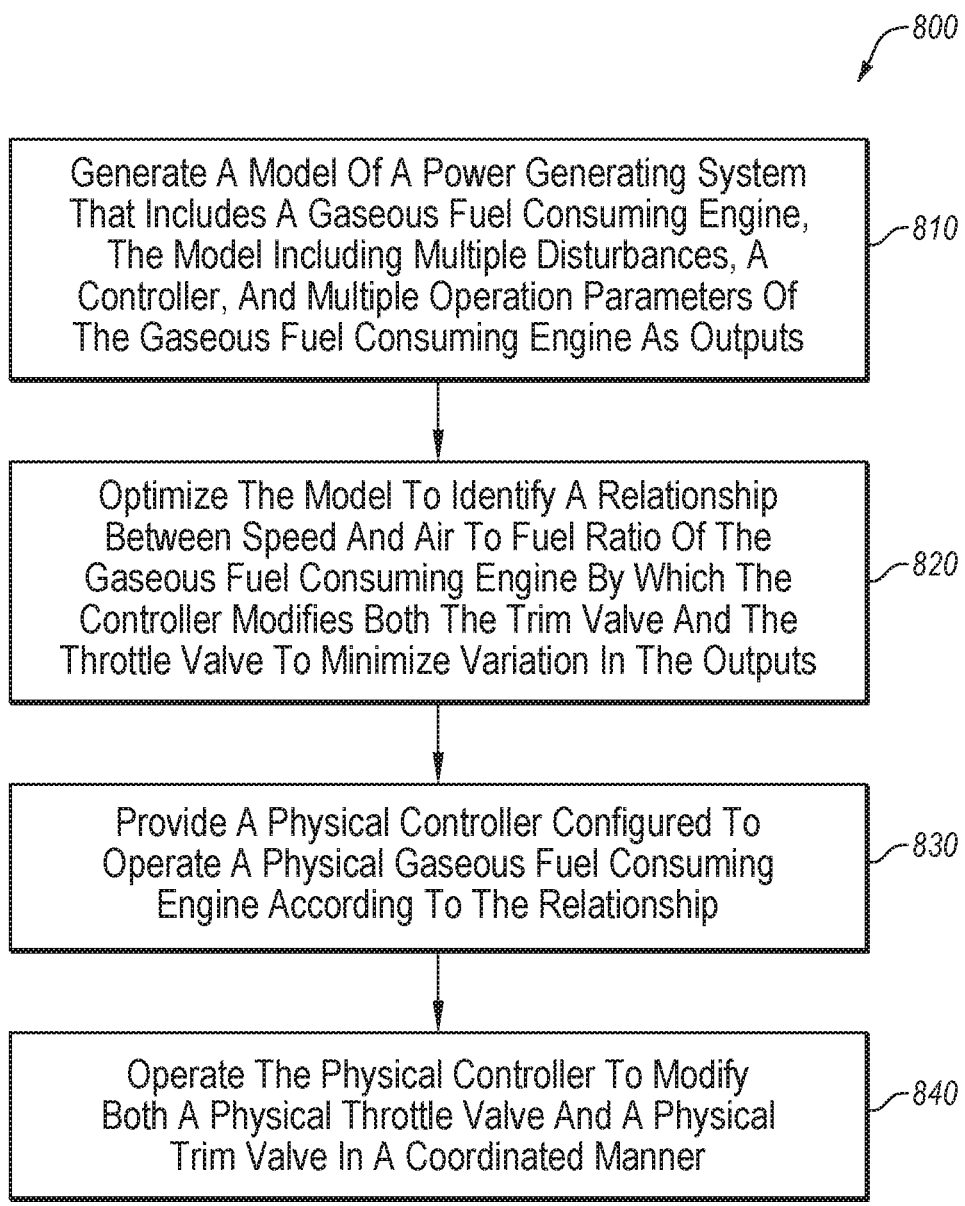
FIG. 8 is a flow diagram of an example method of providing a controller for controlling a gaseous fuel consuming engine.

FIG. 8 is a flow diagram of an example method 800 of providing a controller (e.g., the controller 110 of FIG. 1 or 2A-2C) for controlling a gaseous fuel consuming engine (e.g., the gaseous fuel consuming engine 120 of FIG. 1), in accordance with one or more embodiments of the present disclosure. The method 600 may be performed by any suitable system, apparatus, or device. For example, the controller 110 of FIG. 1, 2B or 2C, or the system 100 of FIG. 1 may perform one or more of the operations associated with the method 600. Although illustrated with discrete blocks, the steps and operations associated with one or more of the blocks of the method 600 may be divided into additional blocks, combined into fewer blocks, or eliminated, depending on the desired implementation.

At block 810, a model (e.g., the model 300 of FIG. 3) of a power generating system (e.g., the system 100 of FIG. 1 may be modeled) that includes a gaseous fuel consuming engine (e.g., the gaseous fuel consuming engine 120 of FIG. 1 may be modeled) may be generated. The model may include multiple disturbances, a controller (e.g., the controller 110 of FIG. 1A or 2A-2C may be modeled), and multiple operation parameters of the gaseous fuel consuming engine as outputs of the model. For example, a model may be generated by interconnecting various components of the model and by weighting one or more various parameters. In some embodiments, the weighting of the parameters may be based on a predetermined goal of the model. In these and other embodiments, the model may be generated in a similar manner to the model 300 of FIG. 3.

At block 820, the model may be optimized to identify a relationship between the speed of the gaseous fuel consuming engine and the air to fuel ratio by which the controller may modify both a trim valve and a throttle valve of the gaseous fuel consuming engine to minimize variation in one or more of the outputs. For example, one or more relationships, parameters, etc. may be modified in optimizing the system to determine what relationship may be most consistent with a predetermined goal of the model. Such a predetermined goal may include, for example, minimizing variations in the speed of the gaseous fuel consuming engine or maintaining the speed of the gaseous fuel consuming engine within a target variance. In some embodiments, optimizing may include modeling a plurality of transient events expected to occur in the circumstances in which the controller may operate. For example, if operating in a mining field, the transient events that may commonly occur in mining fields may be utilized in optimizing the model.

At block 830, a physical controller may be provided that may be configured to operate a physical gaseous fuel consuming engine according to the relationship. For example, a manufacturer or producer of controllers may program or otherwise prepare a controller that may be configured to operate a gaseous fuel consuming engine in accordance with the predetermined relationship determined at block 820. For example, the physical controller may be configured to maintain a speed of the gaseous fuel consuming engine within a target deviance.

At block 840, the physical controller may be operated to modify both a physical throttle valve and a physical trim valve in a coordinated manner. For example, in response to a transient event, the controller may modify both the throttle valve and the trim valve in a coordinated manner such that the speed of the gaseous fuel consuming engine may be maintained within a target deviance. Such operation may be based on the predetermined relationship determined at block 820.

Accordingly, the method 800 may be used to control a gaseous fuel consuming engine. Modifications, additions, or omissions may be made to the method 800 without departing from the scope of the present disclosure. For example, the operations of method 800 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. As another example, the model may additionally include an energy storage device, and the controller may be configured to control the discharge/recharge state of the energy storage device based on SOC of the energy storage device and the speed of the gaseous fuel consuming engine. In these and other embodiments, the optimizing may additionally include identifying a relationship between the discharge state of the energy storage device and the trim valve and the throttle valve of the gaseous fuel consuming engine. Additionally or alternatively, based on modeling transient events for the circumstance in which the controller may operate, a threshold energy storage device size may be determined. For example, if large transient events may occur, a larger capacity energy storage device may be used.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," the term "containing" should be interpreted as "containing, but not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. An engine controller for controlling a gaseous fuel consuming engine, the engine controller comprising non-transitory instructions configured to cause the engine controller to:
   obtain a speed of the gaseous fuel consuming engine;
   obtain an air to fuel ratio of the gaseous fuel consuming engine; and
   based on a transient event affecting the gaseous fuel consuming engine, coordinate modification of both a throttle valve to change the speed of the gaseous fuel consuming engine and a trim valve to change the air to fuel ratio of the gaseous fuel consuming engine to maintain at least one of the speed and the air to fuel ratio of the gaseous fuel consuming engine within a threshold deviance according to a predetermined relationship;
   wherein the predetermined relationship is determined using a model of the gaseous fuel consuming engine and the engine controller, the model including the speed of the gaseous fuel consuming engine as an input and modification of the speed of the gaseous fuel consuming engine and modification of the trim valve as outputs and an initial relationship between modifying the speed of the gaseous fuel consuming engine and modifying the trim valve, the model exposed to multiple disturbances while adjusting the initial relationship to identify the predetermined relationship when modifying both the speed of the gaseous fuel consuming engine and the trim valve, the predetermined relationship consistent with maintaining at least one of the speed and the air to fuel ratio of the gaseous fuel consuming engine within the threshold deviance.

2. The engine controller of claim 1, wherein the coordinated modification includes maintaining the speed of the gaseous fuel consuming engine.

3. The engine controller of claim 1, wherein the coordinated modification includes maintaining the air to fuel ratio of the gaseous fuel consuming engine.

4. The engine controller of claim 1, wherein the coordinated modification includes maintaining both the speed of the gaseous fuel consuming engine and the air to fuel ratio of the gaseous fuel consuming engine.

5. The engine controller of claim 1, wherein the gaseous fuel consuming engine includes a natural gas combustion engine.

6. The engine controller of claim 1, wherein the engine controller is coupled to an energy storage device, and the non-transitory instructions are configured to further cause the engine controller to:
obtain a state of charge of the energy storage device; and
based on the transient event, cause the energy storage device to discharge power.

7. The engine controller of claim 6, wherein the non-transitory instructions are configured to cause the engine controller to:
cause the energy storage device to discharge by providing a positive command current signal to the energy storage device with a magnitude proportional to a target discharge rate; and
cause the energy storage device to recharge by providing a negative command current signal to the energy storage device with a magnitude proportional to a target recharge rate.

8. An engine controller for controlling a gaseous fuel consuming engine, the engine controller comprising non-transitory instructions configured to cause the engine controller to:
obtain a speed of the gaseous fuel consuming engine;
obtain an air to fuel ratio of the gaseous fuel consuming engine; and
based on a transient event affecting the gaseous fuel consuming engine, coordinate modification of both a throttle valve to change the speed of the gaseous fuel consuming engine and a trim valve to change the air to fuel ratio of the gaseous fuel consuming engine to maintain at least one of the speed and the air to fuel ratio of the gaseous fuel consuming engine within a threshold deviance, wherein:
the engine controller is coupled to an energy storage device, and the non-transitory instructions are configured to further cause the engine controller to:
obtain a state of charge of the energy storage device;
based on the transient event, cause the energy storage device to recharge or discharge power;
cause the energy storage device to discharge by providing a positive command current signal to the energy storage device with a magnitude proportional to a target discharge rate; and
cause the energy storage device to recharge by providing a negative command current signal to the energy storage device with a magnitude proportional to a target recharge rate.

9. The engine controller of claim 8, wherein the coordinated modification includes maintaining the speed of the gaseous fuel consuming engine.

10. The engine controller of claim 8, wherein the coordinated modification includes maintaining the air to fuel ratio of the gaseous fuel consuming engine.

11. The engine controller of claim 8, wherein the coordinated modification includes maintaining both the speed of the gaseous fuel consuming engine and the air to fuel ratio of the gaseous fuel consuming engine.

12. The engine controller of claim 8, wherein the gaseous fuel consuming engine includes a natural gas combustion engine.

13. An engine controller for controlling a gaseous fuel consuming engine, the engine controller comprising non-transitory instructions configured to cause the engine controller to:
obtain a speed of the gaseous fuel consuming engine;
obtain an air to fuel ratio of the gaseous fuel consuming engine; and
based on a transient event affecting the gaseous fuel consuming engine, coordinate modification of both a throttle valve to change the speed of the gaseous fuel consuming engine and a trim valve to change the air to fuel ratio of the gaseous fuel consuming engine to maintain both the speed of the gaseous fuel consuming engine within a first threshold deviance and the air to fuel ratio of the gaseous fuel consuming engine within a second threshold deviance,
wherein the engine controller is coupled to an energy storage device, and the non-transitory instructions are configured to further cause the engine controller to:
obtain a state of charge of the energy storage device;
based on the transient event, cause the energy storage device to recharge or discharge power;
cause the energy storage device to discharge by providing a positive command current signal to the energy storage device with a magnitude proportional to a target discharge rate; and
cause the energy storage device to recharge by providing a negative command current signal to the energy storage device with a magnitude proportional to a target recharge rate.

14. The engine controller of claim 13, wherein the gaseous fuel consuming engine includes a natural gas combustion engine.

* * * * *